United States Patent
Iredale et al.

(10) Patent No.: US 10,298,414 B2
(45) Date of Patent: May 21, 2019

(54) INTELLIGENT TRANSDUCERS FOR TRANSFORMING SIGNALS IN COMPLEX COMPUTING NETWORKS

(71) Applicant: BLACK KNIGHT IP HOLDING COMPANY, LLC, Jacksonville, FL (US)

(72) Inventors: James A. Iredale, Ponte Vedra Beach, FL (US); Xiao Jiang, St. Johns, FL (US); Anthony B. Orefice, Jacksonville Beach, FL (US)

(73) Assignee: Black Knight IP Holding Company, LLC, Jacksonville, FL (US)

( * ) Notice: Subject to any disclaimer, the term of this patent is extended or adjusted under 35 U.S.C. 154(b) by 377 days.

(21) Appl. No.: 15/133,512

(22) Filed: Apr. 20, 2016

(65) Prior Publication Data
US 2017/0310712 A1  Oct. 26, 2017

(51) Int. Cl.
*G06F 15/16* (2006.01)
*H04L 12/40* (2006.01)
*H04L 29/06* (2006.01)

(52) U.S. Cl.
CPC ............. *H04L 12/40* (2013.01); *H04L 69/00* (2013.01)

(58) Field of Classification Search
CPC ................................ H04L 12/40; H04L 69/00
See application file for complete search history.

(56) References Cited

U.S. PATENT DOCUMENTS

| | | | | |
|---|---|---|---|---|
| 2005/0108028 A1* | 5/2005 | Arehart | .................. | G06Q 30/02 705/38 |
| 2007/0027799 A1* | 2/2007 | Manelis | ................. | G06Q 40/00 705/38 |
| 2008/0249925 A1* | 10/2008 | Nazari | .................. | G06Q 40/00 705/38 |
| 2009/0070240 A1* | 3/2009 | Millar | .................... | G06Q 20/10 705/30 |
| 2009/0287510 A1* | 11/2009 | Lange | .................... | G06Q 40/00 705/4 |
| 2010/0070408 A1* | 3/2010 | Diaz | ........................ | G06Q 20/10 705/39 |
| 2012/0317016 A1* | 12/2012 | Hughes | ................ | G06Q 40/025 705/38 |
| 2013/0041841 A1* | 2/2013 | Lyons | .................... | G06Q 40/06 705/36 R |
| 2014/0100910 A1* | 4/2014 | Zeng | ....................... | G06Q 10/10 705/7.27 |
| 2014/0222713 A1* | 8/2014 | Faust | ..................... | G06Q 40/06 705/36 R |
| 2014/0330750 A1* | 11/2014 | Faust | ..................... | G06Q 40/06 705/36 R |
| 2014/0358589 A1* | 12/2014 | Schmitt | ................. | G06Q 40/08 705/4 |
| 2016/0078533 A1* | 3/2016 | Dokhanian | .......... | G06Q 40/025 705/38 |

(Continued)

*Primary Examiner* — Moustafa M Meky
(74) *Attorney, Agent, or Firm* — Baker & McKenzie LLP

(57) ABSTRACT

This disclosure is directed to an intelligent transducer for transforming a first event signal received from an input signal system into a second event signal transmitted to an output signal system by using a first event signal-specific transformation signal received from one or more disparate application signal systems and sensing an attribute of the first event signal-specific transformation signal.

20 Claims, 4 Drawing Sheets

(56) References Cited

U.S. PATENT DOCUMENTS

| | | | |
|---|---|---|---|
| 2016/0098681 A1* | 4/2016 | Canis | G06Q 40/12 705/301 |
| 2017/0091231 A1* | 3/2017 | DiFranco | G06F 17/30292 |
| 2017/0148264 A1* | 5/2017 | Pichette | G07F 17/3244 |
| 2017/0193462 A1* | 7/2017 | Bruckner | G06Q 20/027 |

* cited by examiner

INTELLIGENT TRANSDUCERS FOR TRANSFORMING SIGNALS IN COMPLEX COMPUTING NETWORKS

TECHNICAL FIELD

This disclosure is directed to intelligent transducers in complex computing networks, suitably classified in USPC 706/016 (Art Unit 2129) corresponding to CPC G06N 3/08, or in USPC 709/246 or 709/238 (Art Unit 2447) corresponding to CPC H04L 29/00.

BACKGROUND

There is a need for requesting and receiving transformation signals from application signal systems for intelligently transforming event signals in a complex computing network.

BRIEF SUMMARY

In some embodiments, an intelligent communication server is provided for transforming a first event signal received from an input signal system into a second event signal transmitted to an output signal system using a first event signal-specific transformation signal received from one or more disparate application signal systems and sensing an attribute of the first event signal-specific transformation signal. The communication server comprises: a housing; an event signal input communication interface for: establishing a first connection to an input signal system, and receiving, on the first connection, a first event signal from the input signal system; an event signal transformation communication interface for: establishing a second connection to one or more application signal systems, transmitting, on the second connection, a request for a transformation signal to a first application signal system from the one or more application signal systems, and receiving, on the second connection or on a different connection established between the communication server and the first application signal system, the transformation signal from the first application signal system; an event signal output communication interface for establishing a third connection to an output signal system; a chipset disposed in the housing and interfaced with a processor, the chipset having hardware for supporting the first connection to the input signal system, the second connection to the application signal system, and the third connection to the output signal system; and the processor for: accessing a sensor for sensing an attribute of the first event signal; determining, using the sensor for sensing the attribute of the first event signal, the sensed attribute of the first event signal; matching, using the sensed attribute of the first event signal, the first event signal to an intelligent transducer (also referred to as an intelligent agent) from one or more intelligent transducers; determining, using the intelligent transducer, the transformation signal for transforming the first event signal; identifying, from the one or more application signal systems, the first application signal system to which the request for the transformation signal is transmitted and from which the transformation signal is received; accessing a sensor for sensing an attribute of the transformation signal; determining, using the sensor for sensing the attribute of the transformation signal, the sensed attribute of the transformation signal; and transforming the first event signal into the second event signal by generating, based on the sensed attribute for the transformation signal, the second event signal for transmission to the output signal system on the third connection.

In some embodiments, but for the transforming performed by the communication server, the second event signal is unable to be generated by the communication server and transmitted to the output signal system.

In some embodiments, the event signal input communication interface is further for listening for the first event signal.

In some embodiments, the output signal system is listening for the second event signal.

In some embodiments, one or more attributes of the second event signal are presented on a display of a computing device.

In some embodiments, the output signal system comprises a queue or a signal storage system.

In some embodiments, the input signal system and the output signal system are comprised in a single signal system.

In some embodiments, at least one of the first connection, the second connection, and the third connection are comprised in a single connection.

In some embodiments, the second connection is established via a service bus.

In some embodiments, the first application signal system is not connected to a second application signal system from the one or more application signal systems.

In some embodiments, the communication server further comprises an event signal logger for logging metadata associated with at least one of the first event signal, the transformation signal, or the second event signal.

In some embodiments, the metadata comprises at least one of an amount of time for performing the transforming of the first event signal, an identity or authorization of a user or a computing device accessing the communication server, and a success or failure associated with performing the transforming of the first event signal.

In some embodiments, the communication server further comprises an event signal health tracker for determining an amount of time for performing the transforming of the first event signal, and a success or failure associated with performing the transforming of the first event signal.

In some embodiments, the transforming is further performed based on a transformation rule.

In some embodiments, the sensor for sensing the attribute of the first event signal or the sensor for sensing the attribute of the transformational signal is customizable to sense one or more attributes.

In some embodiments, the intelligent transducer is located in the processor.

In some embodiments, the processor is further for enriching at least one of the transformation signal or the first event signal.

In some embodiments, the communication server further comprises a managing transducer for controlling the intelligent transducer.

In some embodiments, the one or more application signal systems are comprised in or accessed via a signal hub.

In some embodiments, a method is provided for transforming a first event signal received from an input signal system into a second event signal transmitted to an output signal system using a first event signal-specific transformation signal received from one or more disparate application signal systems and sensing an attribute of the first event signal-specific transformation signal. The method comprises: establishing a first connection to an input signal system; receiving, on the first connection, a first event signal from the input signal system; accessing a sensor for sensing an attribute of the first event signal; determining, using the sensor for sensing the attribute of the first event signal, the sensed attribute of the first event signal; matching, using the sensed attribute of the first event signal, the first event signal to an intelligent transducer from one or more intelligent transducers; determining, using the intelligent transducer, a transformation signal for transforming the first event signal; identifying, from one or more application signal systems, the first application signal system for requesting the transformation signal; establishing a second connection to the first application signal system; transmitting, on the second connection, a request for a transformation signal to the first application signal system; receiving, on the second connection or on a different connection established between the communication server and the first application signal system, the transformation signal from the first application signal system; accessing a sensor for sensing an attribute of the transformation signal; determining, using the sensor for sensing the attribute of the transformation signal, the sensed attribute of the transformation signal; transforming the first event signal into the second event signal by generating, based on the sensed attribute for the transformation signal; establishing a third connection to an output signal system; and transmitting the second event signal on the third connection.

In some embodiments, a non-transitory computer-readable medium comprising code is configured to cause a computer to facilitate a communication server's transformation of a first event signal received from an input signal system into a second event signal transmitted to an output signal system, the first event signal being transformed using transformation signal received from a first application signal system from among one or more application signal systems, wherein the communication server comprises: an event signal input communication interface for: establishing a first connection to the input signal system, and receiving, on the first connection, the first event signal from the input signal system; an event signal transformation communication interface for: establishing a second connection to the one or more application signal systems, transmitting, on the second connection, a request for transformation signal to the first application signal system from the one or more application signal systems, and receiving, on the second connection or on a different connection established between the communication server and the first application signal system, the transformation signal from the first application signal system; an event signal output communication interface for establishing a third connection to the output signal system; a chipset interfaced with a processor, the chipset having hardware for supporting the first connection to the input signal system, the second connection to the application signal system, and the third connection to the output signal system; and the processor configured for: accessing a sensor for sensing an attribute of the first event signal; determining, using the sensor for sensing the attribute of the first event signal, the sensed attribute of the first event signal; matching, using the sensed attribute of the first event signal, the first event signal to an intelligent transducer from one or more intelligent transducers; determining, using the intelligent transducer, the transformation signal for transforming the first event signal; identifying, from the one or more application signal systems, the first application signal system to which the request for the transformation signal is transmitted and from which the transformation signal is received; and transforming the first event signal into the second event signal by generating, based on the transformation signal, the second event signal for transmission to the output signal system on the third connection.

Figure 1:
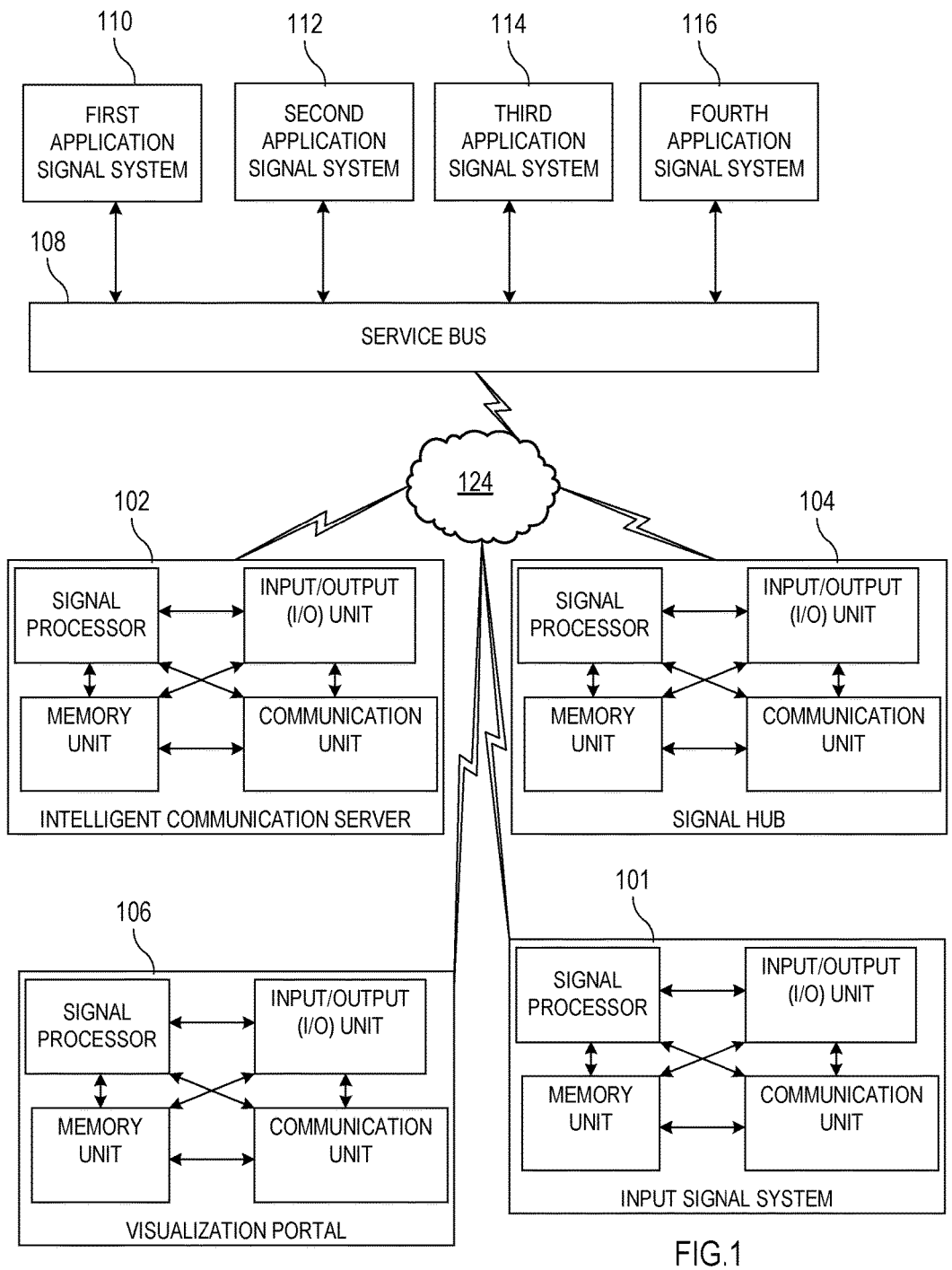
FIG. 1 is a block diagram of a complex computing network for intelligent signal transformation, in accordance with some embodiments of the invention.

All of these drawings are illustrations of certain embodiments. The scope of the claims is not limited to the specific embodiments illustrated in the drawings and described herein.

DETAILED DESCRIPTION OF THE EMBODIMENTS

FIG. 1 is a block diagram of a complex computing network environment for intelligent signal transformation. The network environment comprises a network 124 (e.g., a wired or wireless network) for enabling communication between the various systems presented in FIG. 1. The network environment further comprises an input signal system 101, an intelligent communication server 102, a signal hub 104, and a visualization portal 106 (e.g., a non-mobile computing device such as a desktop computer or a mobile computing device such as a mobile phone, laptop, tablet, watch, etc.). In some embodiments, the visualization portal 106 may be comprised in an output signal system. Alternatively, the visualization portal 106 may be in communication with the output signal system. The network environment further comprises a first application signal system 110, a second applications signal system 112, a third application signal system 114, and a fourth application signal system 116. The various application signal systems may be connected to a service bus 108 which may in turn be connected to the network. In some embodiments, the service bus 108 may be a complex network of interconnections that enables the various applications signal systems to be connected to the network.

In some embodiments, the various application signal systems may additionally or alternatively be directly connected to the network and/or any of the other systems such as the input signal system 101, the intelligent communication server 102, the signal hub 104, or the visualization portal 106. In some embodiments, each of the various application signal systems may comprise signals or data of a certain type. In some embodiments, each of the various application signal systems are disparate, associated with different entities, and there is no overlap of signals between the application signal systems (and no connections, direct and/or indirect) between the application signal systems. In some embodiments, there may be overlap of signals between the application signal systems and there may be connections, direct and/or indirect, between the application signal systems. In some embodiments, the signals from each of the various application signal systems may be comprised in the signal hub 104 such that it may not be necessary to access an individual application signal system when the signal hub 104 receives a request for a signal (e.g., a transformation signal or an enrichment signal) from the intelligent communication server 102. In some embodiments, the signals at an individual application signal system may be accessed by the signal hub 104 to obtain the most recent version of the signals.

Each of the input signal system 101, the intelligent communication server 102, the signal hub 104, and the visualization portal 106, may comprise a signal processor, a memory unit, an input/output (I/O) unit, and a communication unit. The signal processor, the memory unit, the I/O unit, and the communication unit are described in further detail in FIG. 2. As explained in FIG. 2, the memory unit, the I/O unit, the communication unit, and the signal processor may interact via a chipset such as an intelligent chipset. In some embodiments, the functionality of one or more of the input signal system 101, the intelligent communication server 102, the signal hub 104, and the visualization portal 106 may be combined into a single system.

In some embodiments, the term "signal" may refer to "data" or "information." In some embodiments, the terms "signal," "data," and "information" may be used interchangeably. Any reference to signals may also include references to the contents of the signals, e.g., signal attributes. Any signals described herein may be electronic or electromagnetic signals. Additionally, any signals described herein may be either be transitory or non-transitory signals. Additionally, any signals described herein may be analog signals, digital signals, and/or mixed analog and digital signals. The terms "system," "apparatus," "server," "agent," "transducer," "device," "unit," "sub-unit," "element," etc., may be used interchangeably in some embodiments. In some embodiments, a method is provided for performing the various steps performed by any system described herein. In some embodiments, a non-transitory computer-readable medium comprising code is provided for causing a system to perform the various methods described herein. In some embodiments, a system may comprise a housing that includes various units, sub-units, elements, etc., such as those illustrated in FIG. 2. In some embodiments, a chipset may be disposed in the housing and may be interfaced with a processor such as a signal processor. The chipset may have hardware (e.g., electronic components in an electronic circuit) for supporting various connections within the system, or any other connection from the system to external systems or devices.

Figure 2:
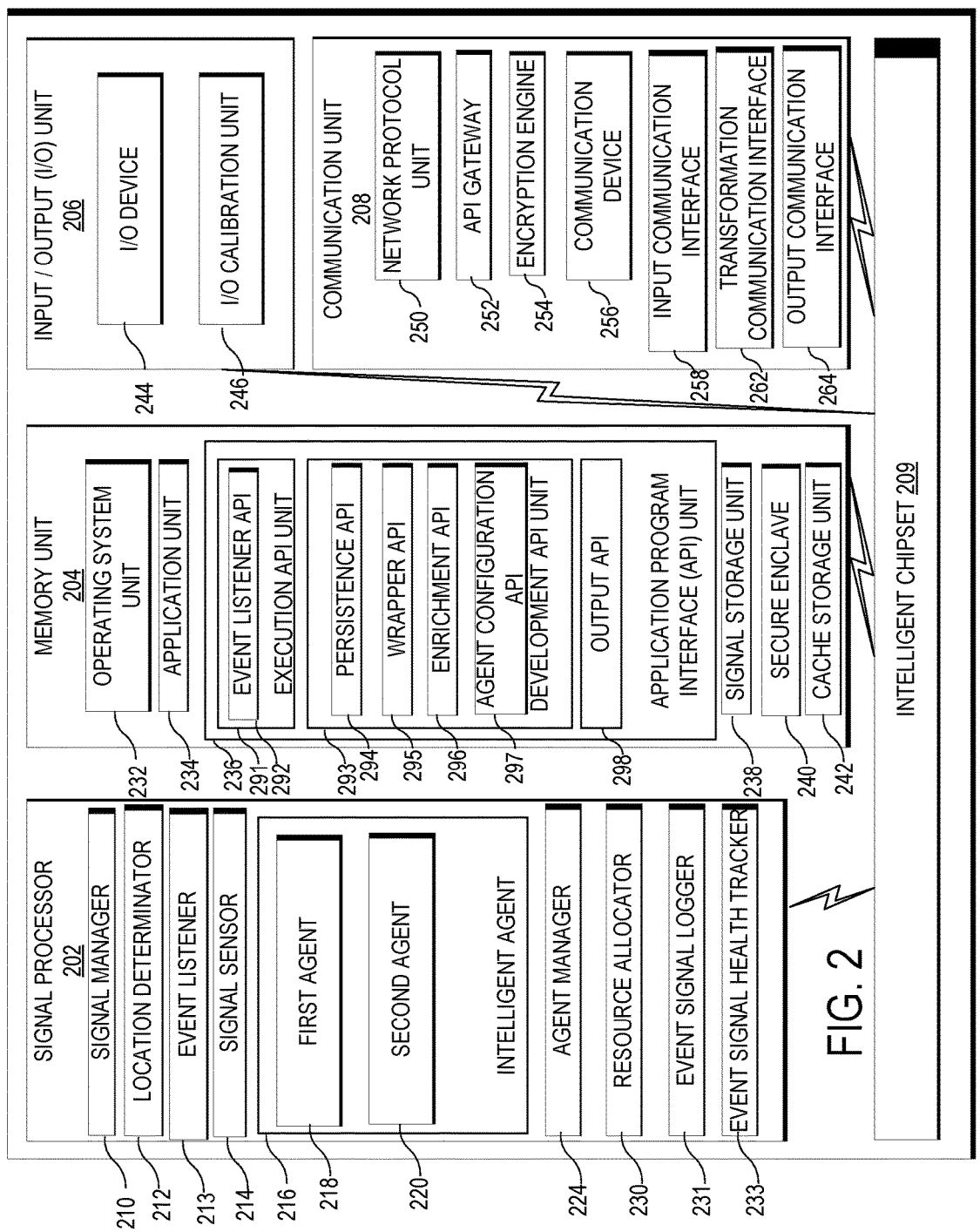
FIG. 2 is a block diagram of a complex computing environment for intelligent signal transformation, in accordance with some embodiments of the invention.

FIG. 2 illustrates an exemplary complex computing environment for intelligent signal transformation. For example, the computing environment may be included in and/or utilized by the input signal system, the intelligent communication server, the signal hub, the visualization portal, any of the application signal systems, and/or any other system described herein. The computing environment and/or any of its units and/or sub-units described herein may include general hardware, specifically-purposed hardware, and/or specially purposed-software.

The computing environment may include, among other units, a signal processor 202, a memory unit 204, an input/output (I/O) unit 206, and/or a communication unit 208. As described herein, each of the signal processor 202, the memory unit 204, the I/O unit 206, and/or the communication unit 208 may include and/or refer to a plurality of respective units, sub-units, and/or elements. The various units, sub-units, and/or elements may be implemented entirely in hardware, entirely in software, or in a combination of hardware and software. Some of the units, sub-units, and/or elements may be optional. Any software described herein may be specially purposed software for performing a particular function. In some embodiments, hardware may also be specially purposed hardware for performing some particular functions. Furthermore, each of the signal processor 202, the memory unit 204, the I/O unit 206, and/or the communication unit 208 may be operatively and/or otherwise communicatively coupled with each other using a chipset 209 such as an intelligent chipset. The chipset 209 may have hardware for supporting the first connection to the input signal system, the second connection to the application signal system, and the third connection to the output signal system. While sub-units may be shown in a particular unit on FIG. 1, the sub-units may alternatively or additionally be present in a different sub-unit. For example, a sub-unit that is present in the memory unit 204 may alternatively or additionally be present in the signal processor 202. Some sub-units may be optional, while other sub-units, not presented in FIG. 2, may also be included in any of the units described herein.

The signal processor 202 may control any of the other units, sub-units of the units, and/or functions performed by the units. Any actions described herein as being performed by a processor may be taken by the signal processor 202 alone and/or by the signal processor 202 in conjunction with one or more additional processors, units, sub-units, elements, components, devices, and/or the like. Additionally, while only one signal processor 202 may be shown in FIG. 2, multiple signal processors may be present and/or otherwise included in the computing environment. Thus, while instructions may be described as being executed by the signal processor 202 (and/or various sub-units of the signal processor 202), the instructions may be executed simultaneously, serially, and/or by one or multiple signal processors in parallel. In some embodiments, the signal processor 202 may refer to any microprocessor, such as a specially purposed microprocessor. In some embodiments, the signal processor 202 may refer to any type of signal processor, including a digital signal processor, an analog signal processor, a mixed analog-digital signal processor, etc.

In some embodiments, the signal processor 202 may be implemented as one or more computer signal processor (CPU) chips and/or graphical signal processor (GPU) chips and may include a hardware device capable of executing computer instructions. The signal processor 202 may execute instructions, codes, computer programs, and/or scripts. The instructions, codes, computer programs, and/or scripts may be received from and/or stored in the memory unit 204, the I/O unit 206, the communication unit 208, sub-units of the aforementioned units, other devices and/or computing environments, and/or the like. As described herein, any unit and/or sub-unit of the computing environment and/or any other computing environment may be utilized to perform any methods described herein. In some embodiments, the computing environment may not include a generic computing system, but instead may include a customized computing system designed to perform the various methods described herein.

In some embodiments, the signal processor 202 may include, among other sub-units, sub-units such as a signal manager 210 (for managing, receiving, processing, analyzing, organizing, any signals), a location determinator 212 (described herein), an event listener 213 (for listening to and subscribing to events released by an input signal system), a signal sensor 214 (for sensing signals and signal attributes), an intelligent agent 216 (comprising a first agent 218 and a second agent 220 and described herein), an agent manager 224 (described herein), a resource allocator 230 (described herein), an event signal logger 231 (described herein), and an event signal health tracker 233 (described herein). In some embodiments, the agent may also be referred to as a transducer. Any transducer described herein refers to a signal transducer (or data transducer or information transducer) that transforms signals (or data or information) from one form (e.g., first event signals) to another (e.g., second event signals). Therefore, any references to the terms agent and transducer are equivalent. Any agent or transducer described herein may be a hardware transducer or agent, or a software transducer or agent (e.g., a set of instructions). Each of the aforementioned sub-units of the signal processor 202 may be communicatively and/or otherwise operably coupled with each other.

The location determinator 212 may facilitate detection, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determinator 212 may include various sensors, a radar, and/or other specifically-purposed hardware elements for enabling the location determinator 212 to acquire, measure, and/or otherwise transform location information of a computing device (e.g., the input signal system, the intelligent communication server, the signal hub, the visualization portal, etc.) in which the location determinator 212 is located or a computing device different from that in which the location determinator 212 is located.

Although a single intelligent agent 216 is shown in FIG. 2, multiple intelligent agents may be provided. In some embodiments, the intelligent agent 216 may analyze an input event such as a first event signal. In some embodiments, the intelligent agent 216 may deserialize (extracting a data structure from a series of bytes) the payload of the first event signal to access the information in the first event signal. The intelligent agent 216 may determine, based on attributes of the first signal event, a first transformation signal and a second transformation signal. The first and second transformation signals may be needed by the intelligent agent 216 in order to transform the first event signal into a second event signal. The first agent 218 may transform the first event signal using the first transformation signal to produce an intermediary transformed event signal, and the second agent 220 may transform the intermediary transformed event signal using the second transformation signal to produce the second event signal. In some embodiments, each agent may perform a certain number of activities (e.g., determining required transformation signals, preparing requests for transformation signals, identifying application signal systems that store or are able to provide the required transformation signals, transforming an event signal using the transformation signals, determining an order of performing the activities, etc.). In some embodiments, each agent may perform more than one transformation, and in such embodiments, the agent determine the order of transformation prior to performing the first transformation. In some embodiments, the various agents described herein may encapsulate the various kinds of sensors described herein and/or work in coordination with the sensors to determine attributes of the first event signals. In some embodiments, the first agent 218 and the second agent 220 may represent a first activity and a second activity performed by the intelligent agent 216. The activity may be a transformation activity or a non-transformation activity.

In some embodiments, the agent manager 224 may control the intelligent agent 216, including the first agent 218 and/or the second agent 220. For example, the agent manager 224 may activate or deactivate the intelligent agent 216 and/or the first agent 218 and/or the second agent 220. The agent manager 224 may manage the subscriptions of the first agent and/or the second agent 220 to the first application signal system (and/or the signal hub) and/or the second application signal system (and/or the signal hub), respectively. The agent manager 224 may also verify a computing system's (or a user of the computing system) credentials to use the intelligent agent 216 and/or the first agent 218 and/or the second agent 220.

In some embodiments, the event signal logger 231 may log metadata associated with at least one of the first event signal, the transformation signal, the enrichment signal, or the second event signal. The metadata may comprise at least one of an amount of time for performing the transforming of the first event signal into the second event signal, an identity or authorization of a user or a computing device accessing the communication server, and a success or failure associated with performing the transforming of the first event signal.

In some embodiments, the event signal health tracker 233 may determine an amount of time for performing the transforming of the first event signal, and a success or failure associated with performing the transforming of the first event signal. The event signal health tracker 233 may produce a lower reading or score if the amount of time for performing the transformation is equal to or greater than a threshold reading or score and/or if the transformation is a failure. The health tracker 233 may produce a higher reading or score if the amount of time for performing the transformation is less than a threshold reading or score and/or if the transformation is a success.

The resource allocator 230 may facilitate the determination, monitoring, analysis, and/or allocation of computing resources throughout the computing environment. As such, computing resources of the computing environment utilized by the signal processor 202, the memory unit 204, the I/O unit 206, and/or the communication unit 208 (and/or any sub-unit of the aforementioned units) such as processing power, data storage space, network bandwidth, and/or the like may be in high demand at various times during operation. Accordingly, the resource allocator 230 may be configured to manage the allocation of various computing resources as they are required by particular units and/or sub-units of the computing environment (e.g., the signal processor 202). In some embodiments, the resource allocator 230 may include sensors and/or other specially-purposed hardware for monitoring performance of each unit and/or sub-unit of the computing environment, as well as hardware for responding to the computing resource needs of each unit and/or sub-unit. In some embodiments, the resource allocator 230 may utilize computing resources of a second computing environment separate and distinct from the computing environment to facilitate a desired operation. Therefore, in some embodiments any signal processor may be referred to as a load-balancing signal processor. Any apparatus described herein may be referred to as load-balancing apparatus or server. The term load-balancing may refer to allocation of computing resources to the various units of the computing environment.

For example, the resource allocator 230 may determine a number of computing operations (e.g., first transformation signal request, first event signal transformation, second transformation signal request, second event signal transformation, etc.). The resource allocator 230 may then determine that the number of computing operations or computing resources (e.g., processing power, storage space of a particular non-transitory computer-readable memory medium, network bandwidth, and/or the like) required by the determined number of computing operations meets and/or exceeds a predetermined threshold value. Based on this determination, the resource allocator 230 may determine an amount of additional computing resources (e.g., processing power, storage space of a particular non-transitory computer-readable memory medium, network bandwidth, and/or the like) required by the signal processor 202, the memory unit 204, the I/O unit 206, the communication unit 208, and/or any sub-unit of the aforementioned units for enabling safe and efficient operation of the computing environment while supporting the number of simultaneous computing operations. The resource allocator 230 may then retrieve, transmit, control, allocate, and/or otherwise distribute determined amount(s) of computing resources to each element (e.g., unit and/or sub-unit) of the computing environment and/or another computing environment. In some embodiments, the allocation of computing resources of the resource allocator 230 may include the resource allocator 230 flipping a switch, adjusting processing power, adjusting memory size, partitioning a memory element, transmitting and/or receiving signals, controlling one or more input and/or output devices, modifying various communication protocols, and/or the like. In some embodiments, the resource allocator 230 may facilitate utilization of parallel processing techniques, e.g., for parallel computing operations. A computing operation may refer to any operation, function, method, process, etc., described in this disclosure.

In some embodiments, the resource allocator 230 may determine an amount of processing power for performing the transforming of the first event signal, and schedule the transforming of the first event when an amount of available processing power available is equal to or greater than the amount of processing power for performing the transforming of the first event signal.

In some embodiments, the memory unit 204 may be utilized for storing, recalling, receiving, transmitting, and/or accessing various signals, signal attributes, or other information during operation of the computing environment. The memory unit 204 may include various types of signal storage media such as solid state storage media, hard disk storage media, and/or the like. The memory unit 204 may include dedicated hardware elements such as hard drives and/or servers, as well as software elements such as cloud-based storage drives. For example, the memory unit 204 may include various sub-units such as an operating system unit 232, an application unit 234, an application programming interface (API) unit 236, a signal storage unit 238 (for storing signals such as event signals or transformation signals, signal attributes, transformation signal requests, enrichment signals, enrichment signal requests, etc.), a secure enclave 240, and a cache storage unit 242.

The memory unit 204 and/or any of its sub-units described herein may include random access memory (RAM), read only memory (ROM), and/or various forms of secondary storage. RAM may be used to store volatile signals and/or to store instructions that may be executed by the signal processor 202. For example, the signals stored may be a command, a current operating state of the computing environment (or of a particular unit or sub-unit of the computing environment), an intended operating state of the computing environment (or of a particular unit or sub-unit of the computing environment), and/or the like. As a further example, signals stored in the memory unit 204 may include instructions related to various methods and/or functionalities described herein. ROM may be a non-volatile memory device that may have a smaller memory capacity than the memory capacity of a secondary storage. ROM may be used to store instructions and/or signals that may be read during execution of computer instructions. In some embodiments, access to both RAM and ROM may be faster than access to secondary storage. Secondary storage may be comprised of one or more disk drives and/or tape drives and may be used for non-volatile storage of signals or as an over-flow signals storage device if RAM is not large enough to hold all working data. Secondary storage may be used to store programs that may be loaded into RAM when such programs are selected for execution. In some embodiments, the memory unit 204 may include one or more databases for storing any signals described herein. Additionally or alternatively, one or more secondary databases located remotely from the computing environment may be utilized and/or accessed by the memory unit 204.

The operating system unit 232 may facilitate deployment, storage, access, execution, and/or utilization of an operating system utilized by the computing environment and/or any other computing environment described herein. In some embodiments, the operating system may include various hardware and/or software elements that serve as a structural framework for enabling the signal processor 202 to execute various operations described herein. The operating system unit 232 may further store various pieces of information and/or data associated with operation of the operating system and/or the computing environment as a whole, such as a status of computing resources (e.g., processing power, memory availability, resource utilization, and/or the like), runtime information, modules to direct execution of operations described herein, user or computing device permissions to access and/or modify any of the systems described herein, security credentials to access and/or modify any of the systems described herein, and/or the like.

The application unit 234 may facilitate deployment, storage, access, execution, and/or utilization of an application utilized by the computing environment. For example, users may be required to download, access, and/or otherwise utilize a software application on a computing device such as a smartphone, tablet, or computing device, in order for various operations described herein to be performed. The computing device may be in communication with the input signal system, the intelligent communication server, the signal hub, the visualization portal, etc. Information included in the application unit 234 may enable a user to execute various computing operations described herein. The application unit 234 may further store various pieces of information associated with operation of the application and/or the computing environment as a whole, such as a status of computing resources (e.g., processing power, memory availability, resource utilization, and/or the like), runtime information, modules to direct execution of operations described herein, user permissions, security credentials, and/or the like.

The API unit may facilitate deployment, storage, access, execution, and/or utilization of information associated with APIs of the computing environment. For example, the computing environment may include one or more APIs for enabling the systems illustrated in FIG. 1 (e.g., the input signal system, the intelligent communication server, the signal hub, the visualization portal, etc.) to communicate with each other and/or perform computing operations described herein. Accordingly, the API unit may include API databases comprising information that may be accessed and/or utilized by applications and/or operating systems of other devices and/or computing environments. In some embodiments, each API database may be associated with a customized physical circuit included in the memory unit 204 and/or the API unit. Additionally, each API database may be public and/or private, and so authentication credentials may be required to access information in an API database. The signal storage unit 238 may facilitate deployment, storage, access, and/or utilization of signals (e.g., event signals, transformation signals, enrichment signals, etc.) by any system, unit, sub-unit, etc., in the computing environment.

In some embodiments, the API unit may comprise an execution API unit 291 (comprising an event listener API 292), a development API unit 293 (comprising a persistence API 294, a wrapper API 295, an enrichment API 296, and an agent configuration API 297), and an output API 298. Each of the various APIs may be executed by the signal processor 202 or one or more sub-units of the signal processor 202. The event listener API 292 may enable parsing of the payload of the first event signal and listening for the first event signal. The persistence API 294 may enable interaction with signal systems that store signals (e.g., first event signals, second event signals, transformation signals, enrichment signals, etc.). The wrapper API 295 may enable linking the various types of signals, signal attributes, and/or systems, units, sub-units, etc., described herein. The enrichment API 296 may enable access of enrichment signals from signal systems which are used to enrich information about attributes for any first event signal and/or transformation signal described herein. The agent configuration API 297 may enable customization of any intelligent agent and/or any other unit or sub-unit of any of the systems of FIG. 1. The output API 298 may enable output of the second event signal to one or more systems that may be listening for or subscribe to the instances of the second event signal.

The secure enclave 240 may facilitate secure storage of signals (e.g., transformation signals, event signals, enrichment signals, etc.) or signal attributes. In some embodiments, the secure enclave 240 may include a partitioned portion of storage media included in the memory unit 204 that is protected by various security measures. For example, the secure enclave 240 may be hardware secured. In other embodiments, the secure enclave 240 may include one or more firewalls, encryption mechanisms, and/or other security-based protocols. Authentication credentials of a user may be required prior to providing the user access to signals stored within the secure enclave 240.

The cache storage unit 242 may facilitate short-term deployment, storage, access, analysis, and/or utilization of signals (e.g., transformation signals, event signals, enrichment signals, etc.). For example, the cache storage unit 242 may serve as a short-term storage location for signals so that the signals may be accessed quickly. In some embodiments, the cache storage unit 242 may include RAM and/or other storage media types that enable quick recall of stored signals. The cache storage unit 242 may included a partitioned portion for storing specific signals.

Any aspect of the memory unit 204 may comprise any collection and arrangement of volatile and/or non-volatile components suitable for storing signals. For example, the memory unit 204 may comprise random access memory (RAM) devices, read only memory (ROM) devices, magnetic storage devices, optical storage devices, and/or any other suitable data storage devices. In particular embodiments, the memory unit 204 may represent, in part, computer-readable storage media on which computer instructions and/or logic are encoded. The memory unit 204 may represent any number of memory components within, local to, and/or accessible by a processor.

The I/O unit 206 may include hardware and/or software elements for enabling the computing environment to receive, transmit, present signals and/or signal attributes. For example, elements of the I/O unit 206 may be used to receive, transmit, present signals, and/or signal attributes, and/or the like. In this manner, the I/O unit 206 may enable the computing environment to interface with a human user. As described herein, the I/O unit 206 may include sub-units such as an I/O device 244 and an I/O calibration unit 246.

The I/O device 244 may facilitate the receipt, transmission, processing, presentation, display, input, and/or output of signals as a result of executed processes described herein. In some embodiments, the I/O device 244 may include a plurality of I/O devices. In some embodiments, the I/O device 244 may include one or more elements of a signal system, a computing device, a server, and/or a similar device.

The I/O device 244 may include a variety of elements that enable a user to interface with the computing environment. For example, the I/O device 244 may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device 244 may include a display, a screen, a projector, a sensor, a vibration mechanism, a light emitting diode (LED), a speaker, a radio frequency identification (RFID) scanner, and/or another element for presenting and/or otherwise outputting signals and/or signal attributes to a user. In some embodiments, the I/O device 244 may communicate with one or more elements of the signal processor 202 and/or the memory unit 204 to execute operations described herein.

The I/O calibration unit 246 may facilitate the calibration of the I/O device 244. For example, the I/O calibration unit 246 may detect and/or determine one or more settings of the I/O device 244, and then adjust and/or modify settings so that the I/O device 244 may operate more efficiently. In some embodiments, the I/O calibration unit 246 may utilize a calibration driver (or multiple calibration drivers) to calibrate the I/O device 244.

The communication unit 208 may facilitate establishment, maintenance, monitoring, and/or termination of communications between the computing environment and other systems, units, sub-units, etc., illustrated in FIGS. 1 and 2. The communication unit 208 may further enable communication between various elements (e.g., units and/or sub-units) of the computing environment. In some embodiments, the communication unit 208 may include a network protocol unit 250, an API gateway 252, an encryption engine 254, a communication device 256, an input communication interface 258 (e.g., for establishing a first connection to an input signal system, and receiving, on the first connection, a first event signal from the input signal system), a transformation communication interface 262 (e.g., for establishing a second connection to one or more application signal systems, transmitting, on the second connection, a request for a transformation signal to a first application signal system from the one or more application signal systems, and receiving, on the second connection or on a different connection established between the communication server and the first application signal system, the transformation signal from the first application signal system), and an output communication interface 264 (e.g., for establishing a third connection to an output signal system and transmitting an output signal such as a second event signal to the signal hub and/or the output signal system). In some embodiments, one or more of the communication interfaces may be combined into a single interface. The communication unit 208 may include hardware and/or software elements.

The network protocol unit 250 may facilitate establishment, maintenance, and/or termination of a communication connection between the computing environment and another device by way of a network. For example, the network protocol unit 250 may detect and/or define a communication protocol required by a particular network and/or network type. Communication protocols utilized by the network protocol unit 250 may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment and any other device, as well as any element internal to the computing environment, may include transforming and/or translating signals from being compatible with a first communication protocol to being compatible with a second communication protocol. In some embodiments, the network protocol unit 250 may determine and/or monitor an amount of signal traffic to consequently determine which particular network protocol is to be used for transmitting and/or receiving signals.

The API gateway 252 may facilitate the enablement of other devices and/or computing environments to access the API unit of the memory unit 204 of the computing environment. For example, a computing device may access the API unit via the API gateway 252. In some embodiments, the API gateway 252 may be required to validate user credentials associated with a user of a computing device prior to providing access of the API unit to the user. The API gateway 252 may include instructions for enabling the computing environment to communicate with another device.

The encryption engine 254 may facilitate translation, encryption, encoding, decryption, and/or decoding of signals received, transmitted, and/or stored by the computing environment. Using the encryption engine 254, each transmission of signals may be encrypted, encoded, and/or translated for security reasons, and any received signals may be encrypted, encoded, and/or translated prior to its processing and/or storage. In some embodiments, the encryption engine 254 may generate an encryption key, an encoding key, a translation key, and/or the like, which may be transmitted along with any signals. The key may need to be known by the recipient in order to read the signals.

The communication device 256 may include a variety of hardware and/or software specifically purposed to enable communication between the computing environment and another device, as well as communication between elements of the computing environment. In some embodiments, the communication device 256 may include one or more radio transceivers, chips, analog front end (AFE) units, antennas, signal processors, memory, other logic, and/or other components to implement communication protocols (wired or wireless) and related functionality for facilitating communication between the computing environment and any other device. Additionally and/or alternatively, the communication device 256 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements be provided according to the structures disclosed herein may be included in integrated circuits or chipsets of any type to which their use commends them, such as ROMs, RAM (random access memory), DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as signal processors (DSP), graphics system processors (GSP), synchronous vector processors (SVP), and image system processors (ISP) all represent sites of application of the principles and structures disclosed herein.

Implementation of any unit or sub-unit of any device described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

The computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations. For example, the input signal system, the intelligent communication server, the signal hub, and/or the visualization portal may be in different geographical locations.

Figure 3A:
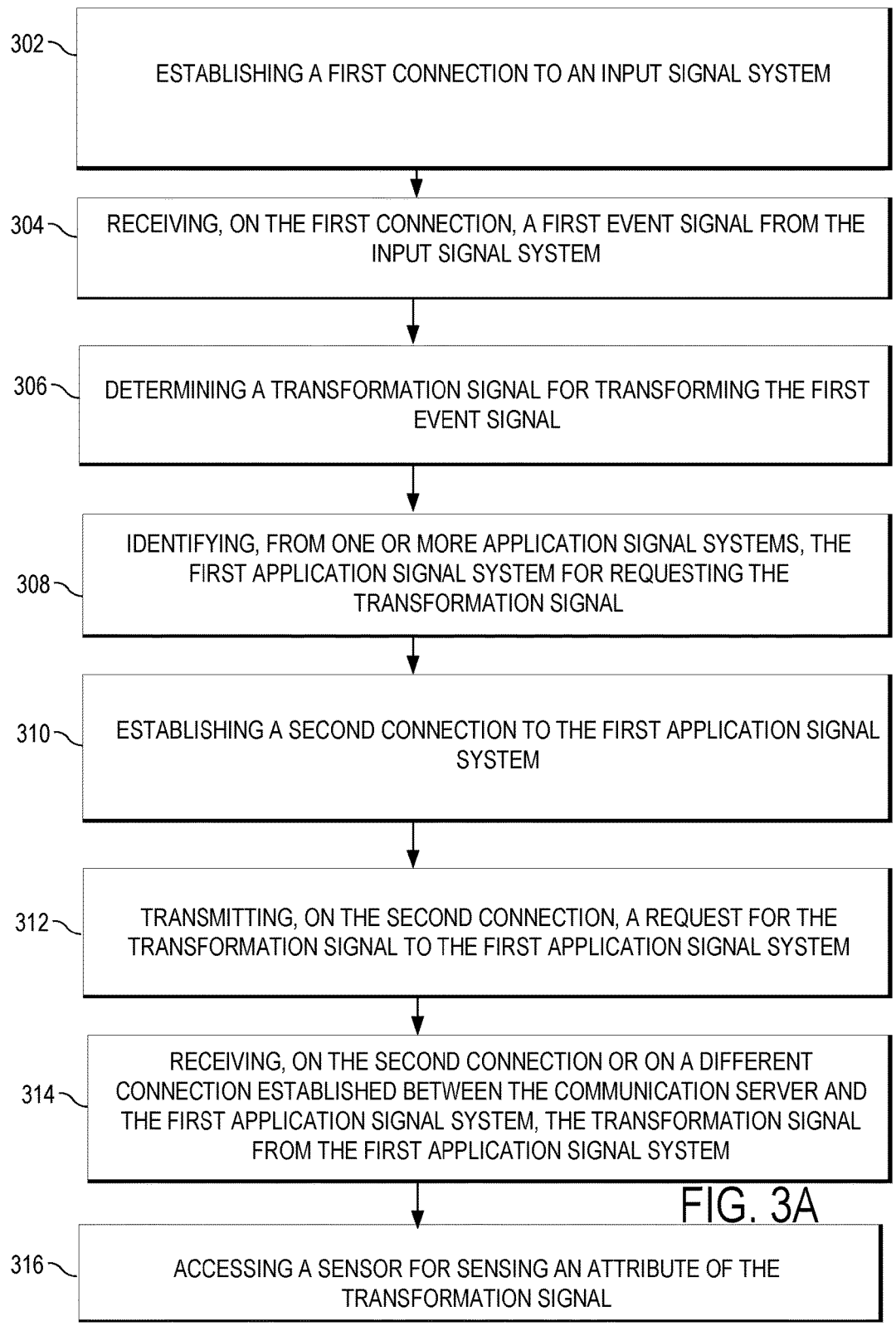
FIGS. 3A and 3B are block diagrams of a method for intelligent signal transformation in a complex computing network, in accordance with some embodiments of the invention.
Figure 3B:
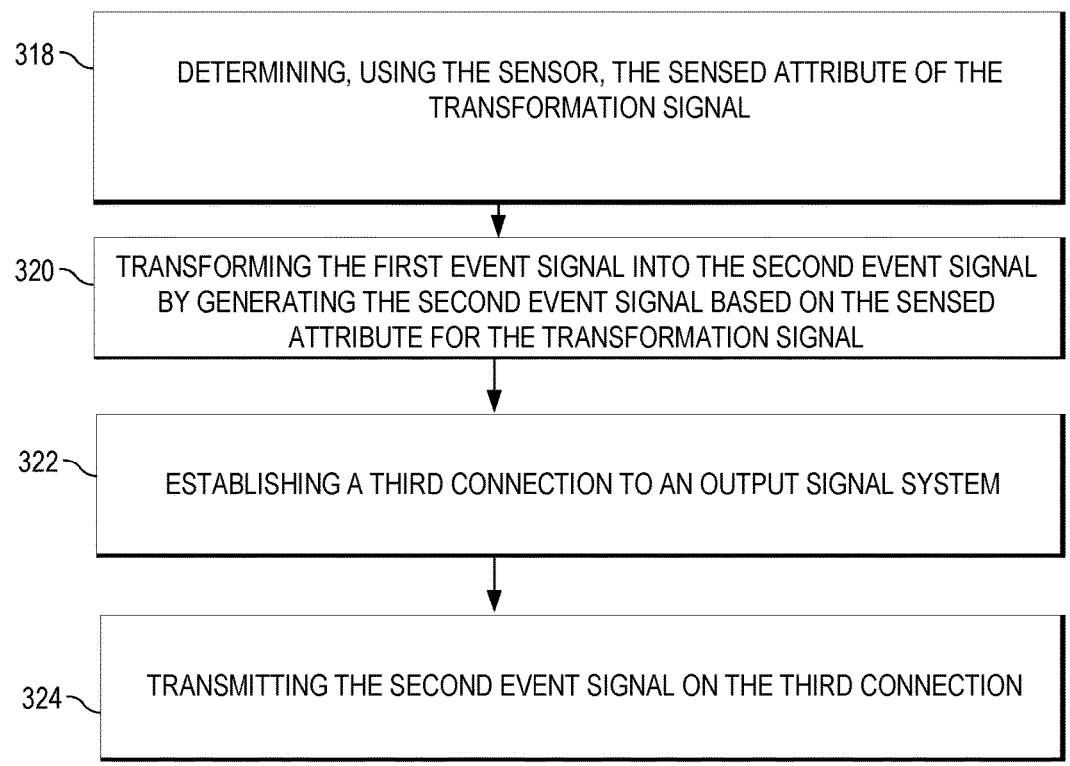

FIGS. 3A and 3B are block diagrams of a method for intelligent signal transformation in a complex computing network. The various blocks of FIGS. 3A and 3B may be executed in a different order from that shown in FIGS. 3A and 3B. Some blocks may be optional. In some embodiments, each of the various blocks of 3A and 3B may be performed by different systems presented in FIG. 1 or any of the units, sub-units, and/or elements presented in FIG. 2, or any combination thereof. For example, the method described herein may be performed by the signal processor 202 of FIG. 2. In some embodiments, the various blocks of 3A and 3B may be performed wholly by any one of the systems presented in FIG. 1 or any one of the units, sub-units, and/or elements presented in FIG. 2.

At block 302, the method comprises establishing a first connection to an input signal system. The input signal system may be any type of computing device, server, etc. At block 304, the method comprises receiving, on the first connection, a first event signal from the input signal system. The method may further comprise listening (e.g., by the input communication interface) for the first event signal. Therefore, in some embodiments, the signal processor described herein may comprise a subscription agent that listens for the first event signal.

In some embodiments, the method may further comprise accessing a sensor for sensing an attribute of the first event signal. In some embodiments, the method may further comprise determining, using the sensor for sensing the attribute of the first event signal, the sensed attribute of the first event signal. In some embodiments, the method may further comprise matching, using the sensed attribute of the first event signal, the first event signal to an intelligent agent from one or more intelligent agents. The selection of the intelligent agent may be based on a sensed attribute of the first event signal (e.g., a type of the first event signal, an identity of an input data system from which the first event signal is received, etc.) which may be sensed using any signal sensor described herein. In some embodiments, the signal sensor may be part of or separate from the intelligent agent. In other embodiments, the signal sensor may be encapsulated into the intelligent agent itself. In some embodiments, each intelligent agent may match with a particular type of first event signal. At block 306, the method comprises determining, using the intelligent agent, a transformation signal for transforming the first event signal.

At block 308, the method comprises identifying, from one or more application signal systems, the first application signal system for requesting the transformation signal. The identify of the application signal system may be based on a sensed attribute of the first event signal. At block 310, the method comprises establishing a second connection to the first application signal system. The first application signal system may comprise a signal hub or may comprise a particular application signal system. In some embodiments, the connection to the signal hub and/or the particular application signal system may be established via a service bus.

At block 312, the method comprises transmitting, on the second connection, a request for a transformation signal to the first application signal system. At block 314, the method comprises receiving, on the second connection or on a different connection established between the communication server and the first application signal system, the transformation signal from the first application signal system or from a different application signal system.

At block 316, the method comprises accessing a sensor for sensing an attribute of the transformation signal. This sensor may be the same sensor or a different sensor from that for sensing an attribute of the first event signal. At block 318, the method comprises determining, using the sensor, the sensed attribute of the transformation signal. In some embodiments, any sensor described herein may be customized to sense one or more different attributes of any signal (e.g., first event signal, transformation signal, enrichment signal, second event signal, etc.).

In some embodiments, the method may further comprise performing a calculation using at least one of the first event signal and the transformation signal to determine an attribute of the first event signal. If the calculated value is equal to or greater than a threshold value, the method may stop and not proceed to transformation of the first event signal. If the calculated value is less than the threshold value, the method may continue to the transforming of the first event signal.

In some embodiments, prior to transforming the first event signal, the method may request an enrichment signal for the first event signal and/or the transformation signal from an application signal system (e.g., either the same application signal system that provided the transformation signal or an application signal system different from that which provided the transformation signal) described herein. In some embodiments, the enrichment signal may additionally be used to perform the calculation described herein (e.g., described previously). The enrichment signal may additionally be used in determining whether to or for transforming the first event signal into the second event signal. In some embodiments, at least one of the first event signal, the transformation signal, and the enrichment signal may be compared to stored signals in a signal system to determine whether there are any matches. If a match is found, the transformation procedure of the stored signal may be used to determine the type of transformation procedure for the first event signal.

In some embodiments, the method may further comprise determining whether transformation has been previously requested for the first event signal. In such embodiments, the method may request an enrichment signal from an application signal system described herein. The enrichment signal may be used by the communication server to determine whether the previously requested transformation is valid based on the enrichment signal or attributes of the enrichment signal. If the previously requested transformation is invalid, the method stops and the first event signal is not transformed. If the previously requested transformation is valid, the method may proceed to transforming the first event signal.

At block 320, the method comprises transforming (e.g., by the intelligent agent of the intelligent communication server) the first event signal into the second event signal by generating the second event signal based on the sensed attribute for the transformation signal. But for the transforming performed by the intelligent agent of the intelligent communication server, the second event signal is unable to be generated and transmitted to the output signal system.

In some embodiments, the transforming may be further based on a current state or condition of the first event signal. For example, if the state of the first event signal is a certain state, the intelligent communication server (or the signal processor) may determine that no transformation of the first event signal is required. As a further example, if the state of the first event signal is another certain state, the intelligent communication server (or the signal processor) may determine that the first event is not eligible for transformation. In some embodiments, any references to the intelligent communication server may additionally or alternatively refer to the signal processor and/or any of the other units in the intelligent communication server and/or any sub-units of the units in the intelligent communication server such as the intelligent agent.

In some embodiments, the transforming step may be further based on one or more transformation rules that are accessed by the intelligent agent. In some embodiments, the transformation rules may determine the type of transformation signals requested by the intelligent communication server. Therefore, whether transforming occurs and the type of transforming that occurs may be based on transformation conditions, transformation rules, or signal attributes that are determined by the intelligent communication server. In some embodiments, the first event signal may be transformed to the second event signal by the intelligent agent by just accessing transformation rules and without requesting and receiving one or more transformation signals. In some embodiments, the transformation rules are stored in the intelligent communication server, while in other embodiments, the transformation rules are stored in a rules server external to the intelligent communication server.

At block 322, the method comprises establishing a third connection to an output signal system. At block 324, the method comprises transmitting the second event signal on the third connection. In some embodiments, the output signal system may be listening for the second event signal. The output signal system may comprise a subscription agent that listens for the second event signal. In some embodiments, one or more attributes of the second event signal (or statistics or trends (e.g., over a period of time) associated with the attributes for one or more second event signals) may be presented on a display of a computing device such as a visualization portal (e.g., in communication with the output signal system). In some embodiments, the output signal system may itself be the visualization portal. In some embodiments, one or more attributes of the first event signal or transformation signal (or statistics or trends (e.g., over a period of time) associated with the attributes for one or more first event signals and/or transformation signals) may be presented on a display of a computing device such as the visualization portal. In some embodiments, conclusions or evaluations associated with a set of first event signals or second event signals may be presented on the display of the computing device. For example, a portion of the set of first event signals or second event signals may be presented as a group because they share similar or same signal attributes. In some embodiments, the output signal system may comprise a queue such as an event signal queue, wherein the output signal system individually or collectively analyzes the event signals on the event signal queue. In some embodiments, the output signal system may comprise a signal storage system such as a database.

In some embodiments, the intelligent communication server returns a success message to a notification system upon successfully transforming the first event signal into the second event signal and/or transmitting the second event signal. In some embodiments, the intelligent communication server returns a failure message to a notification system upon failing to transform the first event signal into the second event signal and/or failing to transmit the second event signal and/or failing to find a listener or output signal system for listening to the transmission or publication of the second event signal.

In some embodiments, at least one of the connections to the input signal system, the output signal system, the application signal system (e.g., the signal hub or a particular application signal system) may be comprised in a single connection. Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between any systems, devices, units, sub-units, elements, etc., described herein, or may occur directly or indirectly via a network, a signal hub, a service bus, a chipset such as an intelligent chipset, etc.

In some embodiments, an intelligent toolkit may be provided. The toolkit may be customizable toolkit for performing the various methods described herein. The toolkit may be installed onto a computing device that enables interaction with, manipulation of, or customization of any of the systems, units, or sub-units presented herein. Once installed, a user may be able to modify, customize, or perform any of the methods described herein. Additionally, a user may be able to customize, modify, or configure any of the systems, units, sub-units, etc., presented in FIGS. 1 and 2. The intelligent toolkit may comprise a non-transitory computer readable medium comprising code configured to cause a computer to perform the various methods of the toolkit and/or any methods described herein.

A signal sensor may be a data sensor. The term "signal" may refer to a single signal or multiple signals. The term "signals" may refer to a single signal or multiple signals. Any reference to a signal may be a reference to an attribute of the signal, and any reference to a signal attribute may refer to a signal associated with the signal attribute. As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, the term "modify" or "modification" may be interchangeably used with the term "transform" or "transformation."

The types of event signals described herein are not limited to any particular field. The event signals may relate to fields such as information technology, finance and electronic commerce, medicine, manufacturing, logistics, real estate, intellectual property, etc. In an example, first event signals may be associated with a loan such as a mortgage loan. In an example, a first event signal is an event for a loan. The event is published or transmitted by the input signal system when the loan is two years old and has private mortgage insurance (PMI) (i.e., a user or borrower makes periodic PMI payments). Exemplary requests for transformation signals may include requests for determining whether the loan payments are current, the current value of the loan, the value of the asset (e.g., property) covered by the loan, the payment frequency, the unpaid principal balance, the interest rate, etc. Transformation signals that may be received by the intelligent communication server may include responses to the exemplary requests. Using one or more of the transformation signals, the intelligent communication server (e.g., the intelligent agent) may determine a ratio of the loan to the value of the asset. The intelligent agent may store or access a transformation rule that states that if the ratio of the loan to the value of the asset is less than certain amount, then the PMI for the loan can be allowed to run off. Therefore, using the transformation signal and the transformation rule, the intelligent agent may determine whether the PMI for the loan can be allowed to run off (i.e., no more PMI payments have to be made by the user). The second event signal is a signal associated with running off the PMI for the loan. The determination of whether the PMI can be run off may be communicated to the output signal system. The output signal system may generate a communication to the user informing the user of whether the PMI will be run off.

In some embodiments, the state of the loan may also be used to determine whether the PMI can be run off for the loan. For example, a transformation rule may dictate that if the loan is in a default state, it is not eligible for PMI run off. In some embodiments, the communication server may receive information that a user has previously requested cancellation of the PMI for the loan. Optionally, the intelligent agent may request transformation signals to determine whether the requested cancellation of the PMI is valid or invalid. Using the transformation rules and/or the transformation signals, the intelligent agent may determine the PMI can be cancelled (i.e., that the user's requested cancellation is valid). This determination may be communicated to the output signal system which may, in turn, communicate the determination to the user. This disclosure is not limited to the examples and/or embodiments described herein.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference numerals are provided in the specification for the first instance of an element that is numbered in the figures. In some embodiments, the reference numerals for the first instance of the element are also applicable to subsequent instances of the element in the specification even though reference numerals may not be provided for the subsequent instances of the element.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s), and their equivalents, that are protected thereby. In all instances, the scope of such claims shall be considered on their own merits in light of this disclosure, but should not be constrained by the headings herein.

The invention claimed is:

1. An intelligent communication server for transforming a first event signal received from an input signal system into a second event signal transmitted to an output signal system using a first event signal-specific transformation signal received from one or more disparate application signal systems and sensing an attribute of the first event signal-specific transformation signal, the communication server comprising:
an event signal input communication interface for:
establishing a first connection to an input signal system, and
receiving, on the first connection, a first event signal from the input signal system;
an event signal transformation communication interface for:
establishing a second connection to one or more application signal systems,
transmitting, on the second connection, a request for a transformation signal to a first application signal system from the one or more application signal systems, and
receiving, on the second connection or on a different connection established between the communication server and the first application signal system, the transformation signal from the first application signal system;
an event signal output communication interface for establishing a third connection to an output signal system;
a chipset interfaced with a processor, the chipset having hardware for supporting the first connection to the input signal system, the second connection to the one or more application signal systems, and the third connection to the output signal system;
the processor for:
accessing a sensor for sensing an attribute of the first event signal;
determining, using the sensor for sensing the attribute of the first event signal, the sensed attribute of the first event signal;
matching, using the sensed attribute of the first event signal, the first event signal to an intelligent transducer from one or more intelligent transducers;
determining, using the intelligent transducer, the transformation signal for transforming the first event signal;
identifying, from the one or more application signal systems, the first application signal system to which the request for the transformation signal is transmitted and from which the transformation signal is received; and
transforming the first event signal into a second event signal by generating, based on the transformation signal, the second event signal for transmission to the output signal system on the third connection; and
a resource allocator for:
first determining computing resources required by at least one of the event signal input communication interface, the event signal output communication interface, the chipset, and the processor exceeds a threshold value;
second determining, based on the first determination, additional computing resources required by the at least one of the event signal input communication interface, the event signal output communication interface, the chipset, and the processor; and
allocating, based on the second determination, available computing resources to the at least one of the event signal input communication interface, the event signal output communication interface, the chipset, and the processor.

2. The communication server of claim 1, wherein but for the transforming performed by the communication server, the second event signal is unable to be generated by the communication server and transmitted to the output signal system.

3. The communication server of claim 1, wherein the event signal input communication interface is further for listening for the first event signal.

4. The communication server of claim 1, wherein the output signal system is listening for the second event signal.

5. The communication server of claim 1, wherein one or more attributes of the second event signal are presented on a display of a computing device.

6. The communication server of claim 1, wherein the output signal system comprises a queue or a signal storage system.

7. The communication server of claim 1, wherein the input signal system and the output signal system are comprised in a single signal system.

8. The communication server of claim 1, wherein at least one of the first connection, the second connection, and the third connection are comprised in a single connection.

9. The communication server of claim 1, wherein the second connection is established via a service bus.

10. The communication server of claim 1, wherein the first application signal system is not connected to a second application signal system from the one or more application signal systems.

11. The communication server of claim 1, further comprising an event signal logger for logging metadata associated with at least one of the first event signal, the transformation signal, or the second event signal.

12. The communication server of claim 11, wherein the metadata comprises at least one of an amount of time for performing the transforming of the first event signal, an identity or authorization of a user or a computing device accessing the communication server, and a success or failure associated with performing the transforming of the first event signal.

13. The communication server of claim 1, further comprising an event signal health tracker for determining an amount of time for performing the transforming of the first event signal, and a success or failure associated with performing the transforming of the first event signal.

14. The communication server of claim 1, wherein the processor is further for:
   accessing a sensor for sensing an attribute of the transformation signal; and
   determining, using the sensor for sensing the attribute of the transformation signal, the sensed attribute of the transformation signal,
   wherein the transforming is further performed based on a transformation rule, and
   wherein the sensor for sensing the attribute of the first event signal or the sensor for sensing the attribute of the transformational signal is customizable to sense one or more attributes.

15. The communication server of claim 1, wherein the intelligent transducer is located in the processor.

16. The communication server of claim 1, wherein the processor is further for enriching at least one of the transformation signal or the first event signal.

17. The communication server of claim 1, further comprising an agent manager for controlling the intelligent transducer.

18. The communication server of claim 1, wherein the one or more application signal systems are comprised in or accessed via a signal hub.

19. A method for transforming a first event signal received from an input signal system into a second event signal transmitted to an output signal system using a first event signal-specific transformation signal received from one or more disparate application signal systems and sensing an attribute of the first event signal-specific transformation signal, the method comprising:
   establishing a first connection to an input signal system;
   receiving, on the first connection, a first event signal from the input signal system;
   accessing a sensor for sensing an attribute of the first event signal;
   determining, using the sensor for sensing the attribute of the first event signal, the sensed attribute of the first event signal;
   matching, using the sensed attribute of the first event signal, the first event signal to an intelligent transducer from one or more intelligent transducers;
   determining, using the intelligent transducer, a transformation signal for transforming the first event signal;
   identifying, from one or more application signal systems, a first application signal system for requesting the transformation signal;
   establishing a second connection to the first application signal system;
   transmitting, on the second connection, a request for a transformation signal to the first application signal system;
   receiving, on the second connection or on an alternate connection established between the communication server and the first application signal system, the transformation signal from the first application signal system;
   accessing a sensor for sensing an attribute of the transformation signal;
   determining, using the sensor for sensing the attribute of the transformation signal, the sensed attribute of the transformation signal;
   transforming the first event signal into a second event signal by generating, based on the sensed attribute for the transformation signal, the second event signal for transmission to the output signal system on the third connection;
   establishing a third connection to an output signal system;
   transmitting the second event signal on the third connection;
   first determining computing resources required by the intelligent transducer;
   second determining, based on the first determination, additional computing resources required by the intelligent transducer; and
   allocating, based on the second determination, available computing resources to the intelligent transducer.

20. A non-transitory computer-readable medium comprising code configured to cause a computer to facilitate a communication server's transformation of a first event signal received from an input signal system into a second event signal transmitted to an output signal system, the first event signal being transformed using transformation signal received from a first application signal system from among one or more application signal systems,
   wherein the communication server comprises:
      an event signal input communication interface for establishing a first connection to the input signal system, and receiving, on the first connection, the first event signal from the input signal system;
      an event signal transformation communication interface for:
         establishing a second connection to the one or more application signal systems, transmitting, on the second connection, a request for transformation signal to the first application signal system from the one or more application signal systems, and
         receiving, on the second connection or on a different connection established between a communication server and the first application signal system, the transformation signal from the first application signal system;

an event signal output communication interface for establishing a third connection to the output signal system;

a chipset interfaced with a processor, the chipset having hardware for supporting the first connection to the input signal system, the second connection to the one or more application signal systems, and the third connection to the output signal system;

the processor for:
accessing a sensor for sensing an attribute of the first event signal;
determining, using the sensor for sensing the attribute of the first event signal, the sensed attribute of the first event signal;
matching, using the sensed attribute of the first event signal, the first event signal to a transducer from one or more transducers;
determining, using the transducer, the transformation signal for transforming the first event signal;
identifying, from the one or more application signal systems, the first application signal system to which the request for the transformation signal is transmitted and from which the transformation signal is received; and
transforming the first event signal into the second event signal by generating, based on the transformation signal, the second event signal for transmission to the output signal system on the third connection; and a resource allocator for:
first determining computing resources required by at least one of the event signal input communication interface, the event signal output communication interface, the chipset, and the processor exceeds a threshold value;
second determining, based on the first determination, additional computing resources required by the at least one of the event signal input communication interface, the event signal output communication interface, the chipset, and the processor; and
allocating, based on the second determination, available computing resources to the at least one of the event signal input communication interface, the event signal output communication interface, the chipset, and the processor,
wherein allocating the available computing resources comprises adjusting memory size for an operation associated with the at least one of the event signal input communication interface, the event signal output communication interface, the chipset, and the processor.

* * * * *